United States Patent
Chuang et al.

(10) Patent No.: US 7,074,293 B2
(45) Date of Patent: Jul. 11, 2006

(54) METHOD TO IMPROVE FILM PROPERTY

(75) Inventors: Kun-Lin Chuang, Taoyuan (TW); Shu-Yuan Huang, Taoyuan (TW); Ming-Hsiung Sung, Taoyuan (TW)

(73) Assignee: Optimax Technology Corporation, Taoyuan (TW)

( * ) Notice: Subject to any disclaimer, the term of this patent is extended or adjusted under 35 U.S.C. 154(b) by 0 days.

(21) Appl. No.: 10/993,254

(22) Filed: Nov. 19, 2004

(65) Prior Publication Data

US 2005/0183811 A1 Aug. 25, 2005

(30) Foreign Application Priority Data

Feb. 20, 2004 (TW) ................ 93104395 A

(51) Int. Cl.
*B29C 65/02* (2006.01)
*B32B 37/26* (2006.01)

(52) U.S. Cl. ............... 156/249; 156/230; 156/247; 428/1.1

(58) Field of Classification Search ........ 156/249, 156/230, 247, 182, 297, 305, 306.3; 428/1.1
See application file for complete search history.

(56) References Cited

U.S. PATENT DOCUMENTS

| | | | |
|---|---|---|---|
| 3,904,797 A * | 9/1975 | Jones et al. | 252/299.3 |
| 5,000,809 A * | 3/1991 | Adesko et al. | 156/230 |
| 6,261,665 B1 * | 7/2001 | Murata et al. | 428/143 |
| 6,455,101 B1 | 9/2002 | Sasaki et al. | 427/130 |
| 6,571,729 B1 | 6/2003 | Sasaki et al. | 118/723 R |
| 6,767,630 B1 | 7/2004 | Okuyama | 428/354 |
| 2002/0028286 A1 | 3/2002 | Sasaki et al. | 427/131 |
| 2003/0064579 A1 | 4/2003 | Miyakawa et al. | 438/628 |
| 2003/0198807 A1 * | 10/2003 | Banba et al. | 428/343 |
| 2004/0169290 A1 * | 9/2004 | Takei et al. | 257/783 |

FOREIGN PATENT DOCUMENTS

| | | |
|---|---|---|
| TW | 498318 | 8/2002 |
| TW | 524748 | 3/2003 |
| TW | 546728 | 8/2003 |
| TW | 553828 | 9/2003 |

\* cited by examiner

*Primary Examiner*—Chris Fiorilla
*Assistant Examiner*—Sonya Mazumdar
(74) *Attorney, Agent, or Firm*—Alan D. Kamrath; Nikolai & Mersereau, P.A.

(57) ABSTRACT

A method improves the property of films including a release film and a protective film. After separating from the release film, the protective film is bonded with a TAC (Triacetyl Cellulose) film and then processed by coating, such as with an anti-reflecting coating, an anti-glaring coating and a surface hardening treatment, and by drying in an oven. The protective film is separated from the TAC film. The waste of material, which resulted from cracks, snaps and bends of the film, is avoided in the process. Furthermore, practice costs are low, and additional expensive apparatus or treatment are not necessary for a simplified procedure of the method.

12 Claims, 4 Drawing Sheets

US 7,074,293 B2

METHOD TO IMPROVE FILM PROPERTY

BACKGROUND OF THE INVENTION

1. Field of the Invention

The present invention relates to a method to improve properties of a film including a release film and a protective film. The protective film is bonded with a TAC (Triacetyl Cellulose) film after separating from the release film. The bonded TAG film is processed by coating, such as with an anti-reflecting coating, an anti-glaring coating or a surface hardening treatment, and by driving in an oven. Thereafter, the protective film is separated from the TAC film.

2. Description of the Prior Art

As science develops day-by-day and advances greatly, the products for high technologies are focused on the principles of having small volume and being lightweight for marketing. Thus, the procedures for manufacturing may be considered more than before. For example, a film is very fragile and tends to be cracked or bent due to the thin thickness thereof. Hence, the cost of raw materials is greater than required. In the field, there is no solution to the above issue, and prior art for another field is provided hereinafter for discussion.

A Taiwan patent, numbered 524748, teaches a film sticking method. Firstly, the surface film is removed by a roller. The base film is cut at spacings, and strips thereof are removed from the bottom film. Then, after directing by rollers, the bottom film is on substrates.

Another Taiwan patent, numbered 546728, is related to an adhesive film for protecting a wafer surface of a semiconductor. At least one middle layer and an agglutinant layer are provided on one surface of a base film. The minimum value (G'min) range of a storing flexibility rate (G') of the agglutinant layer (B) in the temperature range of 50 to 100° C. is between 0.07 to 5 Mpa. The storing flexibility rate for the middle layer (C) at 50° C. is above 0.001 Mpa, but not approaching to 0.07 Mpa. A total thickness (μm) of the agglutinant layer's thickness (tb) and the middle layer's thickness (tc) meets the following equation: $tc \geq 3\ tb$.

The third Taiwan Patent No. 498318 discloses a method for manufacturing a protecting film of a recording information disk. A magnetic film for recording information is manufactured on a surface of a substrate, and continuously, a protecting film is made on the magnetic film. The manufacturing temperature for the protecting film is higher than the manufacturing temperature for the magnetic film. After the magnetic film is made, the substrate is heated so as to approach the temperature for making the protecting film.

The fourth Taiwan patent, numbered 553828, is a method for sticking a film. A pressing roller rolls over a film on a substrate so as to that the film sticks on the substrate. The pressing roller is capable of maintaining the film in a certain status, that is, an outer circumference surface of the pressing roller maintains a front, sticky portion of the film. The pressing roller is continuously rotated to deliver the film to the substrate so as to that the front portion is exactly positioned for adherence on the substrate. A rear, sticky portion of the film may be kept by the outer circumference surface as well. Therefore, the pressing roller completely sticks the front portion to the rear portion of the film on the substrate.

Above prior art may cooperate with expensive equipment or require pre-processing. Thus, it is obvious that the cost cannot be low and that complicated procedures certainly increase the difficulty and the possibility of fault.

SUMMARY OF THE INVENTION

The present invention relates to a method to improve properties of film. The first objective of the present invention is to prevent waste of the material, which resulted from cracks, snaps and bends of the film in the process.

The present invention relates to a method to improve properties of film. The second objective of the present invention is to offer a method having low practice costs and not requiring additional expensive apparatus or treatment for a simplified procedure of the method.

The present invention relates to a method to improve properties of a film including a release film and a protective film. The protective film is bonded with a TAC (Triacetyl Cellulose) film after separating from the release film. The bonded TAC film is processed by coating, such as with an anti-reflecting coating, an anti-glaring coating or a surface hardening treatment, and by drying in an oven. Then, the protective film is separated from the TAC film.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objectives, spirit and advantages of the preferred embodiments of the present invention will be readily understood by the accompanying drawings and detailed descriptions, wherein.

DETAILED DESCRIPTION OF THE PREFFERED EMBODIMENT

Figure 1:
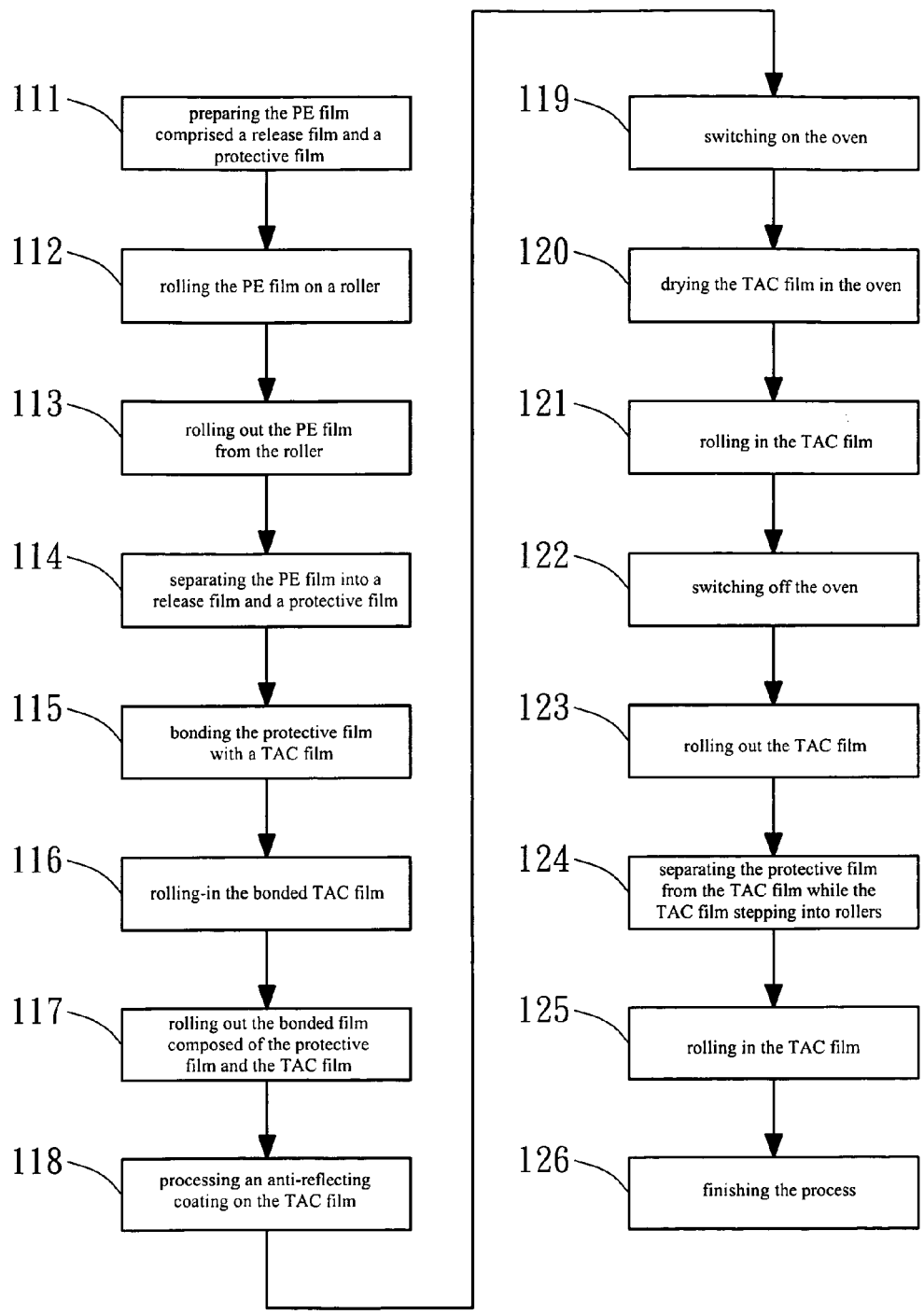
FIG. 1 is a process diagram of the present invention.

FIG. 1 relates to a process diagram of the present invention. The process broadly comprises three stages: film bonding (steps 111~116), coating (steps 117~122) and film separating (steps 123~126).

Figure 2:
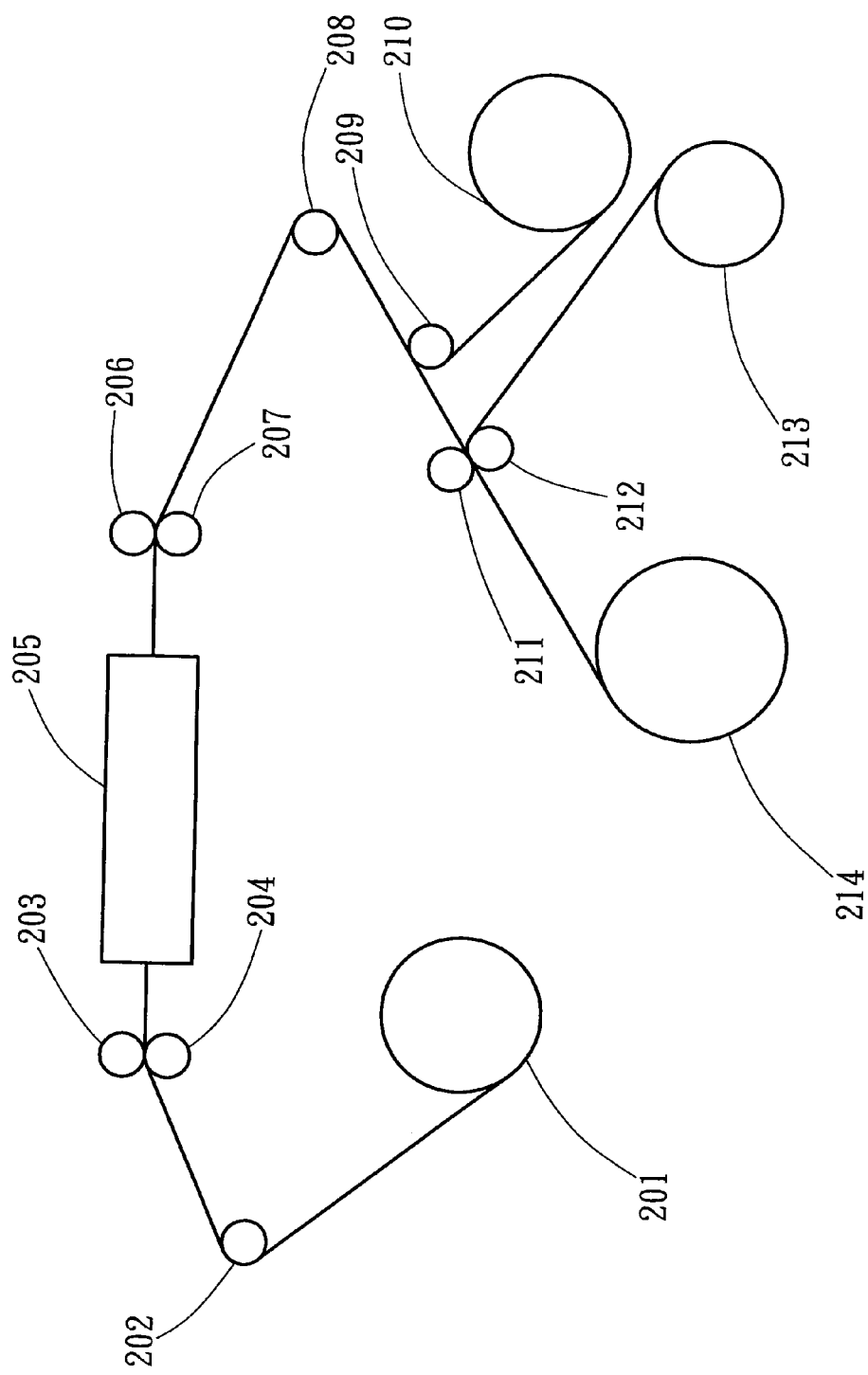
FIG. 2 is a bonding stages of the process for a TAC (Triacetyl Cellulose) film and a protective film of the present invention.

FIG. 2, presents a bonding stage of the process (steps 111~116 in FIG. 1) for a TAC (Triacetyl Cellulose) film and a protective film of the present invention. A film 201 is used including a release film and a protective film having a gluey face (step 111 in FIG. 1). In practice, film could be formed from PE (polyethylene). However, PET (polyethylene Terephthalate) can also be used instead of PE. The film 201 rolled on a roller (step 112 in FIG. 1) is rolled out (step 113 in FIG. 1) to an oven 205 by assistance of rollers 202, 203 and 204. The oven 205 is not operated at this time.

The film 201 coming from the oven 205 is assisted by rollers 206, 207 and 208 to separate a release film from the protective film. At the roller 209, the release film having no gluey face is separated from the protective film (step 114 in FIG. 1) and gathered in a release film roller 210. Parameters including an appropriate tension and rolling rates of the roller 209 for separating the release film from the protective film must be considered.

After separating from the release film, the protective film is bonded with a TAC film 213 by rollers 211 and 212 (step 115 in FIG. 1). A variety of parameters have to be considered in this step, including the tension, the rolling rates, bonding speeds and viscosity of glues on the protective film. Then, the bonded film 214 is rolled-in (step 116 in FIG. 1), and the bonding process is finished (steps 111~116).

Figure 3:
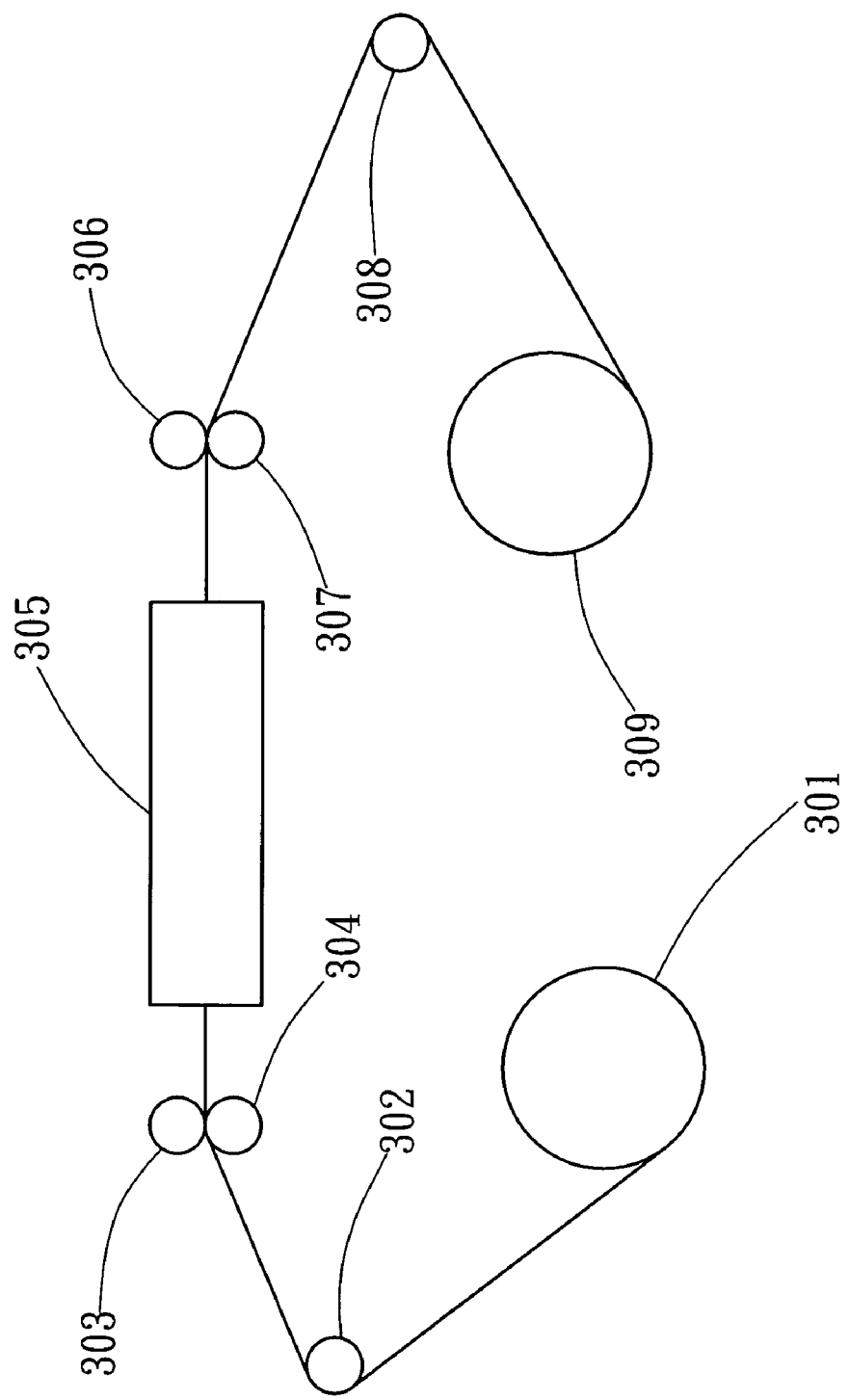
FIG. 3 is a coating stage of the process for anti-reflecting, anti-glaring and surface hardening of the present invention.

FIG. 3 presents a coating stage of the process (steps 117~422 in FIG. 1) for providing anti-reflecting, anti-glaring and surface hardening. The bonded film 301 (bonded film 214 of FIG. 2) including the protective film and the TAC film 213 is rolled-out (step 117 in FIG. 1) by a roller 302 and processed by coating, such as with an anti-reflecting coating, an anti-glaring coating or a surface hardening treatment (step 118 in FIG. 1). Parameters including the tension, coating speeds and drying temperatures have to be considered in the coating process. A variety of coating types and TAC film thickness are adopted in the present invention. An oven 305 is switched on (step 119 in FIG. 1) after coating of the film. The TAC film 301 is dried in the oven 305 by functioning of rollers 303 and 304 (step 120 in FIG. 1). The dried TAC film 309 is rolled-in after directing by rollers 306, 307 and 308 (step 121 in FIG. 1). The oven 305 is switched off after rolling-in (step 122 in FIG. 1), and the coating stage of the process is finished (steps 117~122).

Figure 4:
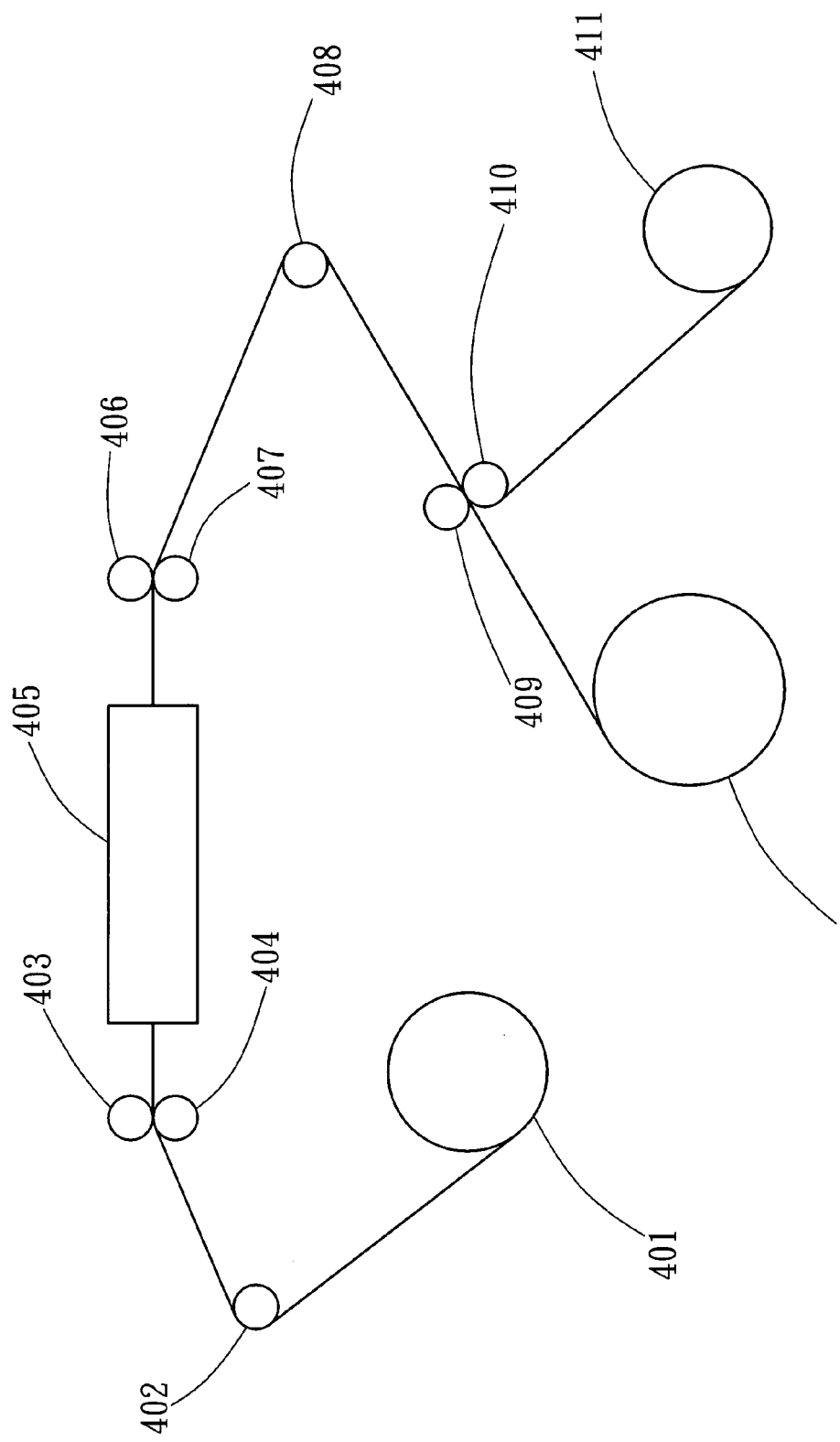
FIG. 4 is a separating stage of the process of the anti-reflecting TAC film from the protective film.

FIG. 4 presents a separating stage of the process (steps 123~126 in FIG. 1). The TAC film 401 (TAC film 309 of FIG. 3) is rolled-out (step 123 in FIG. 1) and directed into a oven 405 by functioning of rollers 402, 403 and 404. The oven 405 is switched off at this moment. By functioning of rollers 406, 407 and 408, the TAC film 401 is directed for the separating process.

While the TAC film 401 passes between a roller 409 and a roller 410, the protective film is separated from the TAC film (step 124 in FIG. 1) and gathered in a protective film roller 411. Parameters including an appropriate tension and rolling rates of the roller for separating the protective film from the TAC film 401 must be considered. The separated TAC film is gathered in a TAC film roller 412 (step 125 in FIG. 1), and the separating process is finished (steps 123~126).

The present invention prevents waste of material, which resulted from cracks, snaps and bends in the film in the process. Furthermore, practice costs are low, and additional expensive apparatus or treatments are not necessary for a simplified procedure of the method.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A method comprising:
    providing a stock film including a release film and a protective film;
    separating the release film from the protective film;
    bonding a TAC (Triacetyl Cellulose) film with the protective film after separation of the release film from the protective film;
    coating the bonded TAC film;
    drying the coated and bonded TAC film in an oven; after drying, separating the protective film from the TAC film; and after the separation of the protective film from the TAC film, rolling the TAC film into a roll.

2. The method according to claim 1, wherein providing the stock film comprises providing a PE (Polyethylene) film.

3. The method according to claim 1, wherein providing the stock film comprises providing a PET (Polyethylene Terephthalate) film.

4. The method according to claim 1, wherein bonding the TAC film with the protective film includes rolling the bonded TAC film into a roll; and before coating the bonded TAC film, unrolling the roll of bonded TAC film.

5. The method according to claim 4 wherein drying the coated and bonded TAC film comprises switching on the oven; (3D) drying the coated and bonded TAC film in the oven; engaging the coated and bonded TAC film after drying by rollers; switching off the oven; and after engaging the coated and bonded TAC film, rolling the dried TAC film into a roll.

6. The method according to claim 5, further comprising unrolling the roll of the dried TAC film prior to separating the protective film from the TAC film.

7. The method according to claim 5, wherein coating the bonded TAC film comprises coating the bonded TAC film with at least one of the following: an anti-reflective coating, an anti-glaring coating and a surface hardening treatment.

8. The method of claim 1, wherein separating the release film from the protective film comprises: engaging the stock film with a plurality of rollers, with separating the release film from the protective film comprising rotating one of the plurality of rollers between the release film and the protective film.

9. The method of claim 1, wherein bonding the TAC film with the protective film comprises simultaneously passing the TAC film and the protective film between abutting rollers.

10. The method of claim 5 wherein drying the coated and bonded TAC film further comprises engaging the coated and bonded TAC film with a plurality of rollers before entering and after leaving the oven.

11. The method of claim 1 with separating the protective film after drying comprising engaging the dried, coated and bonded TAC film between abutting first and second rollers, with the protective film passing around the second roller.

12. The method of claim 11 further comprising engaging the dried, coated and bonded TAC film with a plurality of rollers.

* * * * *